United States Patent Office 3,605,717
Patented Sept. 20, 1971

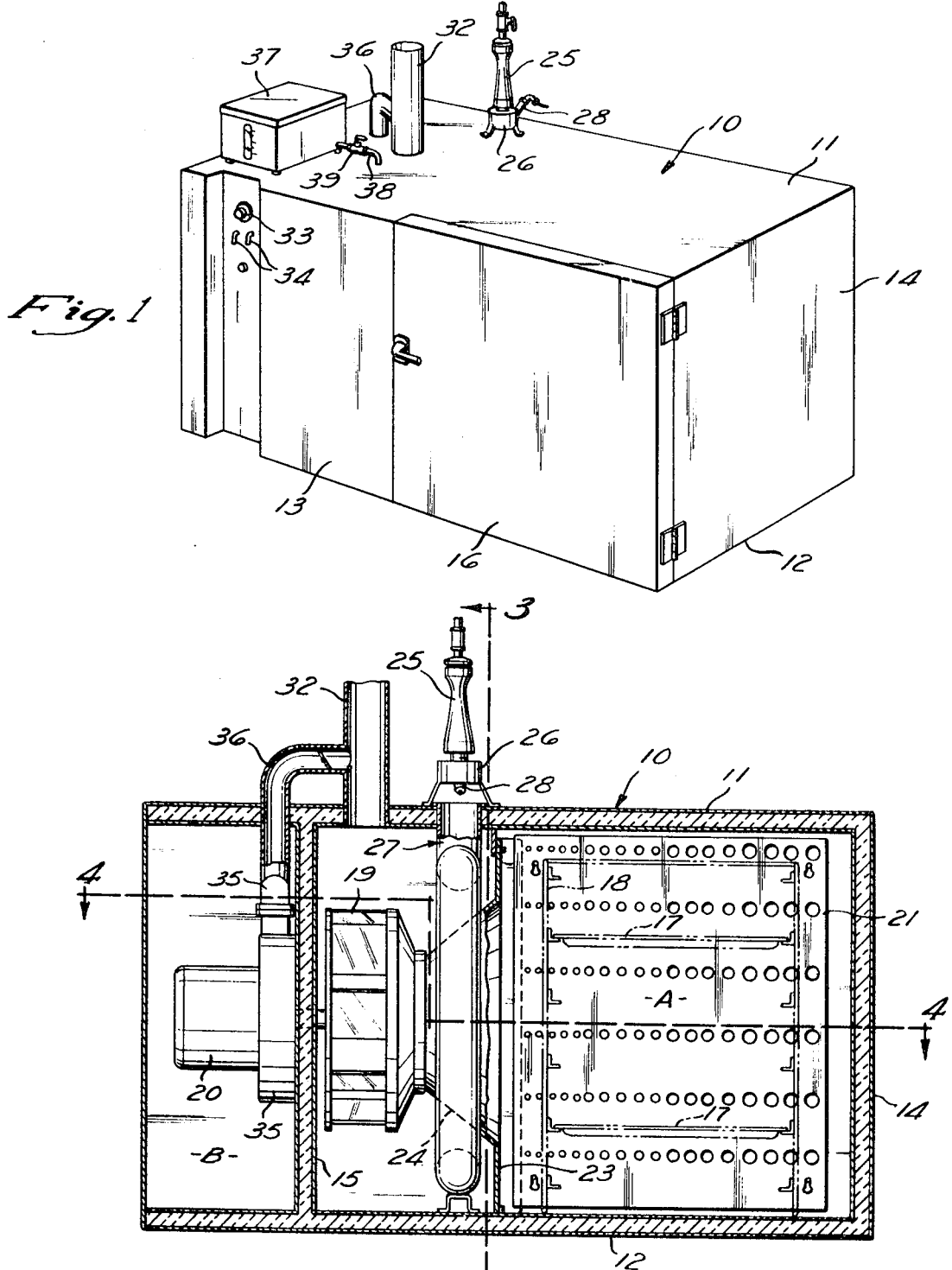

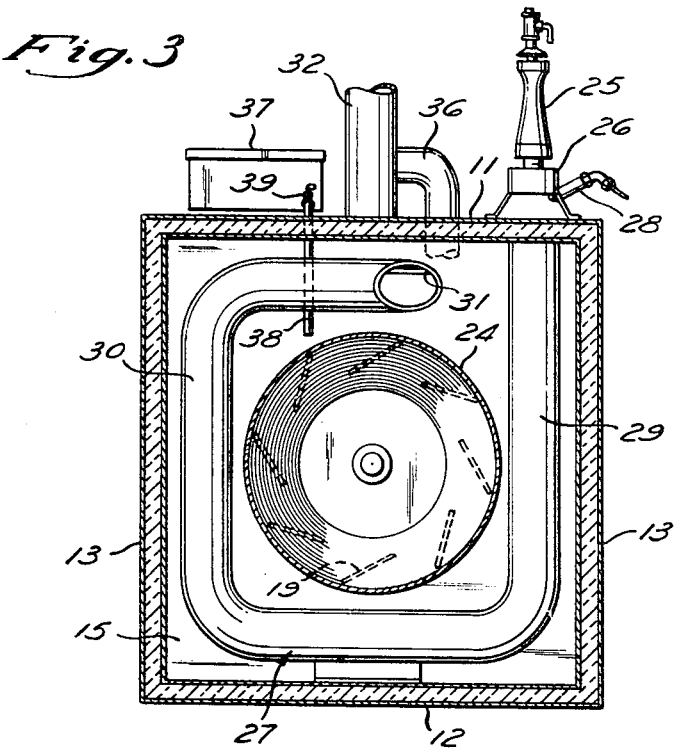
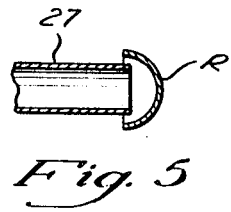
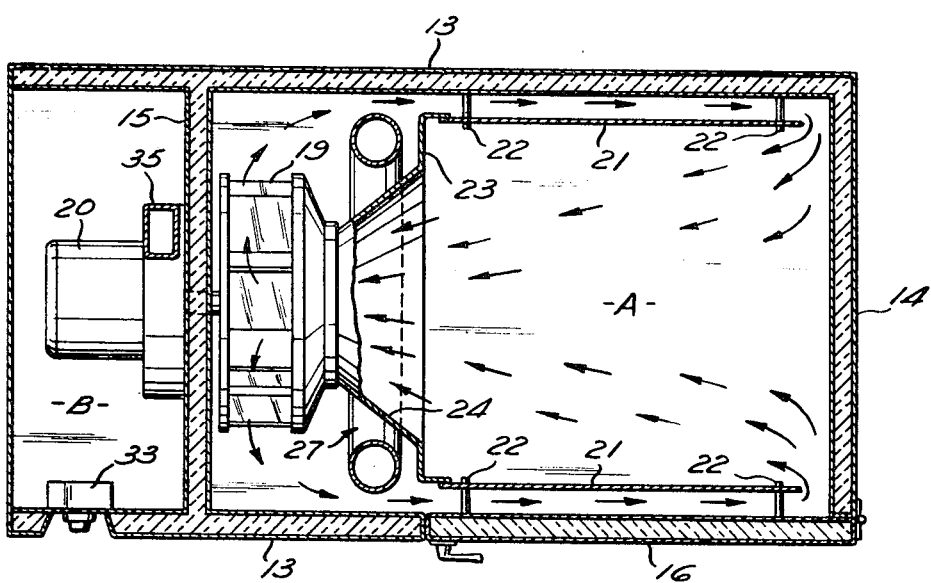

3,605,717
CONVECTION OVEN
Paul H. Sauer, Burg-Dillkreis, Germany, assignor to Crown-X, Inc., Cleveland, Ohio
Filed Nov. 10, 1969, Ser. No. 875,370
Int. Cl. F24c 15/32
U.S. Cl. 126—21A
12 Claims

ABSTRACT OF THE DISCLOSURE

A gas-fired convection oven for processing food, for example, having a fan for moving air along a circulatory path over, along and about the food to be processed. A gun-type gas burner outside the oven is directed into a burner tube of substantial length extending into the oven. High-temperature exhaust gases are discharged from the burner to be directed into the circulatory path of air adjacent the exhaust side of the fan. The burner tube also provides substantial heat-exchange exposure to the circulating air.

BRIEF SUMMARY OF THE INVENTION

This invention is directed to an improvement in convection ovens for processing; e.g., frying, baking, and/or thawing food. Food placed inside such ovens is processed by moving heated air along a circulatory path directed and arranged to provide throughout the food chamber substantially uniform temperatures of a preselected and controllable level. The circulatory path is generally defined by the walls of the oven, by baffling and by the food supporting means in the food chamber. The air is moved along the circulatory path by a fan or blower usually located adjacent the food chamber and in the circulatory path.

In the path, the circulated air and gases in such convection ovens have been heated by passing them over and around electrically heated coils, steam pipes, or heated flues, relying only upon an exchange of heat between the heating system and the air to maintain the desired air temperature in the oven.

This invention comprises the improvement of supplying heat to the oven by burning gaseous fuel and air mixtures in a heat conducting burner tube having one end open to atmosphere outside the oven and extending inside the oven in the circulatory path. A gas burner located outside the oven directs a combustible mixture of gaseous fuel and air axially of and into the burner tube through the end open to atmosphere. Additional amounts of air are drawn into the burner tube from atmosphere to insure as complete and rapid combustion as possible. The resulting hot gases are introduced directly from the burner tube into the circulatory path. There also is substantial exposure of the circulating medium to the hot walls of the tube providing additional heat input by heat exchange.

The burner tube consists of at least a long straight section in which combustion of the gaseous fuel and air mixture takes place. The straight section extends generally from one side of the oven to another and may terminate there in a discharge opening or, preferably, it may turn within the oven and continue on to provide a combustion chamber of increased length. The invention contemplates a high heat input to the oven so that it may be rapidly brought up to desired operating temperatures. At the same time, it is preferred, if not necessary, that the flame be confined within and not extend beyond the end of the burner tube. The burner tube is preferably of substantial diameter to permit a good supply of air to be drawn into it, thereby keeping the flame as short as possible while burning increased amounts of fuel. The length of the burner tube is advantageous to confine as long a flame as possible. The turning and bending of the burner tube within the oven not only provides the advantageous length but also permits the positioning and/or distribution of one or more auxiliary discharge openings in preferred locations to achieve the desired heat input to the circulating medium.

The burner tube opens and discharges its hot gases and products of combustion directly into the circulating medium. The main discharge opening of the burner tube is preferably adjacent the exhaust side of the fan or blower and faces in such a direction, e.g. generally downstream, that the fan output tends to reduce the back pressure at the discharge end of the burner tube. In addition to the main discharge opening, additional discharge openings may be provided along the length of the flue section to provide a distribution of the hot gases, if desired. The main discharge opening at the end of the burner is the largest and the primary opening.

The improvement permits a more rapid rate of heat input and greater heat inputs in an oven of given dimensions than is possible with conventional heat exchanger types of ovens. The rate of introduction and the amount of heat than can be introduced in the manner described in connection with this improvement is increased within the space of a given convection oven by using a relatively large diameter burner tube providing a substantial length of combustion chamber between its opening to atmosphere at one end and its discharge opening at the other end. The burner tube may enter through any wall and extend in any direction within the oven. This permits a variety of installation circumstances and burner mounting locations to be accommodated easily and inexpensively without special designs and equipment.

As mentioned above, the amount of heat and the rate at which it can be introduced directly into the circulating medium is beneficially increased by discharging the burner tube directly into the circulating medium. Another advantage is also realized. The direct discharge of the combustion gases into the circulating medium used to process the food provides a source of moisture desirable in the processes carried out in the oven.

The high temperature which can be developed in the oven require that the electric motor preferred for driving the fan or blower and the control devices and mechanisms be mounted in a space insulated from the heated space of the oven. Also, the motor is preferably cooled by drawing substantial volumes outside air through it with a small auxiliary blower mounted on and driven by the motor. The exhaust air from this blower, although heated in its passage through the motor, can advantageously be discharged in the outlet flue of the oven to dilute and thereby to cool the relatively much hotter flue gases as may be desired and desirable.

BRIEF DESCRIPTION OF THE DRAWINGS

FIG. 1 is a perspective view of an oven embodying a preferred form of this invention;

FIG. 2 is a side elevation view of the oven in FIG. 1 and sectioned as indicated;

FIG. 3 is a transverse section through the preferred embodiment taken in the planes indicated at 3—3 in FIG. 2;

FIG. 4 is a top plan view sectioned on the planes of 4—4 in FIG. 2; and

FIG. 5 is an elevation view in section and enlarged scale of an alternate form of discharge terminal portion for the burner tube.

DETAILED DESCRIPTION OF A PREFERRED EMBODIMENT

The oven comprises a box-like housing 10 having well-insulated top, botton, side and end walls, 11, 12, 13, and 14, respectively. The space within the housing is divided by wall 15 into a larger food processing chamber A comprising a substantial part of the total space and a smaller equipment chamber B comprising the remainder of the space as shown most clearly in FIGS. 2 and 4. Wall 15 is preferably insulated to protect the equipment and controls contained within chamber B from the high temperatures normally present in chamber A.

Food to be processed is conveniently placed in chamber A through door 16 and onto suitable means such as trays 17 removably supported in racks 18 shown in dotted outline in FIG. 2. The trays and rack for them form no part of this invention. They are shown and described briefly to aid in the disclosure of the invention. The trays are spaced apart throughout the chamber to permit heated air and gases to be freely and uniformly circulated over, around, and about all the goods being processed. It is desirable to provide and maintain all the food at a relatively uniform temperature, and the proper arrangement of the trays or similar means contributes to this result.

The flow of heated air and gases to process the food is provided by a blower having a conventional wheel 19 driven by an electric motor 20. Motor 20 is mounted on wall 15 in equipment chamber B. The motor extends through wall 15 and supports wheel 19 centrally of one end of food processing chamber A.

The flow of air provided by the blower is directed in a circulatory path in chamber A and over and around the food to be processed. Air leaving wheel 19 from outlet passages opening onto its periphery is thrown to the outside walls. The air is then directed along both sides of chamber A and toward the opposite end from the blower through side passages provided by side walls 13 and baffle plates 21. Circulation in these passages is as indicated by the arrows in FIG. 4. Baffle plates 21 are spaced from and parallel to the adjacent walls and are preferably supported on means such as posts 22. One baffle plate 21 may conveniently be supported on door 16 forming substantially one side wall 13. Baffle plates 21 are spaced from each other and accommodate in the space between them the rack 18 for supporting the food to be processed.

Baffle plates 21 terminate short of end wall 14 so that circulation is continued from the side passages they provide into the central portion of chamber A between the baffle plates. Again, this is indicated by arrows on FIG. 4. If desired, openings may be provided in baffle plates 21 as shown to permit secondary air circulation from the side passages into the central portion of the food processing chamber to insure temperature uniformity throughout the space containing the food.

The air circulation path is directed back to the blower by conical inlet baffle 23 placed across the blower end of the space between side baffle plates 21. The conical portion 24 of baffle 23 directs air circulation into the axial air inlet of blower wheel 19, completing the circulatory flow path through food processing chamber A.

Heat is preferably provided by an externally mounted, conventional "gun-type" burner 25 for burning flammable mixtures of gas and air. Burner 25 is mounted on the oven by a fixture 26 having legs supporting the burner away from one end of burner tube 27 and leaving both the outlet end of burner 25 and the tube 27 exposed to atmosphere. Gas is supplied to burner 25 through a suitable pipe connected to a source (not shown) and mixed with aspirated air in a manner well known in the gas burner field. Air is also drawn from the atmosphere through openings to atmosphere adjacent the gas jet provided by mounting fixture 26. Burner mounting fixture 26 provides a convenient place for mounting a pilot or other burner lighting means 28.

The improvement here disclosed and claimed is not limited to an atmospheric-type burner, but comprehends all types of gas burning devices including pre-mix types in which pre-mixed quantities of gaseous fuel and air are supplied to the burner under a suitable pressure.

Externally mounted burner 25 is directed through a wall of housing 10 of the oven and into the end of a burner tube indicated generally at 27. Burner tube 27 comprises a straight section of pipe or conduit 29 having one end opening to atmosphere in the top wall 11 of housing 10 and extends into chamber A generally adjacent wheel 19 of the blower as shown. Burner 25 is aligned with respect to burner tube 27 so that the long flame provided by the burner is directed into the center of straight section 29 of tube 27.

Efficient combustion in burner tube 27 releasing high amounts of heat is promoted by reducing the resistance to gaseous fluid flow of burner tube 27. To this end, an initial straight section 29 of substantial length is preferred Therefore, straight section 29 preferably extends along a major dimension of chamber A so that as great a length as possible may be accommodated within the envelope of housing 10. As shown in the drawings, straight section 29 extends from top wall 11 downwardly past wheel 19 of the blower toward bottom wall 12 to provide a length nearly equal to the entire height of the oven housing.

Straight section 29 of the burner tube preferably is joined by a bend to an additional tube section 30. Section 30 continues around the blower in chamber A finally terminating in a primary discharge opening 31 adjacent the outlet openings of wheel 19. The length of tube section 30 is preferably long enough so that burner tube 27 entirely sheaths the flame from burner 25. In other words, it is preferred that combusion be substantially completed within burner tube 27. Generally speaking, higher rates of fuel input increase the length of the flame. The flame length tends to be decreased by encouraging the necessary quantities of air to be present and mixed with the gaseous fuel during combustion in the burner tube. This involves providing air to the burner tube, and encouraging its entrance therein by using a tube of ample diameter to decrease fluid flow resistance and by reducing the pressure at the discharge end of the burner tube. In the embodiment shown and described, the burner tube has an inside diameter of about 3½ inches and a total length of about 66 to 72 inches measured along the centerline of the tube. The major dimensions of food processing chamber A are approximately 4 feet long and 2½ feet deep and high. As shown most clearly in FIG. 3, primary discharge opening 31 lies generally in a plane parallel to the axis of the burner tube section leading to it and faces or is directed generally downstream in the circulatory path coming out of the outlet passages on the periphery of wheel 19. This orientation of primary discharge opening 31 with respect to the circulatory flow path provided by the blower tends to reduce the back pressure on the burner tube and promotes the achievement of maximum heat input into the oven by gas burner 25.

The purpose fulfilled by facing primary discharge opening 31 generally downstream may be accomplished by other structures, so long as they tend to reduce the back pressure at the end of the burner tube. One such alternate arrangement shown in FIG. 5. The terminal portion and end of burner tube 27 is shown in section directed into the concave side of a hemispherical deflector or, indeed, reverser R. Assuming that the circulating medium is flowing from right to left as viewed in FIG. 5, it will be seen that fluid flow will tend to reduce the pressure at the annular opening between tube 27 and reverser R and thereby reduce the back pressure on the burner tube. Other arrangements may be used for accomplishing the same purpose and are thus equivalent to means facing "generally downstream" and are comprehended by recitations of such means, both general and specific, in this description and the appended claims.

The additional tube section 30 of burner tube 27 may be provided with secondary discharge openings at points along its length in order to adjust and regulate the distribution of heat output from the tube and into the circulatory flow of air and gases through the oven. Such openings may be provided, for example, by piercing the side wall of tube 27 and covering the openings with scoop-shaped shields having an open side facing downstream of the flow off wheel 19 to promote flow out of the secondary discharge openings.

It will be noted that heat is introduced into the oven by direct discharge of the hot gases and products of combustion from the gas burner into the circulatory path of air and gas flow of the oven. Also, heat is added to the circulated medium by exchange between the hotter burner tube 27 and the cooler medium passing over the substantial length of the various sections of the tube.

The novel method and manner of heat input provided by the improved structure of this invention permits a higher heat input at a faster rate into an oven of a given size and food-holding capacity. This advantageous result can be utilized to carry out a given food processing task in a given oven in a shorter time than, or in a smaller, lighter oven in the same time as, could be accomplished with known ovens. For example, an oven embodying this invention and having an approximately 24 cubic foot food processing chamber A and utilizing a gas burner of about 140 thousand B.t.u. capacity has successfully been heated from room temperature to about 550°–575° F. in ten to twelve minutes. In addition, the high temperature moisture normally contained in the flue gases discharged from the burner tube can be advantageously used to moisturize the food being processed.

Chamber A is also provided with an outlet stack or flue 32. It is desirable to locate this stack generally upstream of the burner tube discharge opening 31 to reduce the tendency for the hot gases to go up the stack.

Controls 33 and 34 of a conventional nature for the electric motor 20 and the gas burner 25, respectively, to regulate the temperature of food processing chamber A are mounted in equipment chamber B together with the electric motor and insulated from the high temperatures of food processing chamber A.

Another advantage of the particular heat input arrangement comprehended by this invention is that the gas burner and burner tube may be located and enter the oven housing on different sides. The burner tube 27 assembly can be positioned so that the straight section is directed to receive the jet flame from a burner mounted on the top 11, sides 13, or bottom 12, depending upon the circumstances and requirements of each particular oven installation. This makes it possible to operate an oven in some locations previously not easily utilized and brings about manufacturing economies because it permits the same components to be assembled in a variety of configurations.

Although not necessary to the successful operation of the improvement comprising the invention disclosed and claimed herein, further advantage can be obtained by providing a small auxiliary blower 35 mounted on one end of motor 20. Blower 35 draws air through the motor to cool it and also provides a source of substantially cooler air to be added to the high temperature being exhausted from the oven out stack 32. By diluting the exhaust gases with cooler air, their temperature may be kept below a suitable level. In addition, the auxiliary supply of air boosts the flow out of the stack when desired. The air is directed to stack 32 from the outlet of auxiliary blower 35 through piping 36 equipped with a suitable control to regulate the amount of auxiliary blower air to be added to the flue gases. If auxiliary blower 35 is not used to provide a supply of cooling air to dilute the hot flue gases in stack 32, a smaller fan may be employed only to cool the electric motor.

This oven disclosed and claimed herein is well adapted to processing food, including thawing frozen foods in shorter times than previously known ovens. Side baffle plates 21 and conical inlet baffle 23 are removably mounted for ease and convenience in cleaning the food processing chamber.

The oven embodying this invention also permits additional amounts of moisture to be added to the circulating air or medium efficiently and effectively. As shown in FIGS. 1 and 3, a small tank 37 having an outlet conduit 38 controlled by valve 39 is mounted on top of housing 10. Conduit 38 enters food processing chamber A through top wall 11 and is directed to and terminates above blower wheel 19. Water flows by gravity at a rate determined by control valve 39 and drops toward wheel 19 and against the heated air or circulating medium flowing outwardly from the wheel. This effectively atomizes and/or vaporizes the drops of water and mixes the moisture with the air circulating through food processing chamber A. The uniform and rapid distribution of the water or moisture is promoted by the direct discharge of the burning gases into the food processing chamber. And, the benefits of the burner tube arrangements are augmented by the addition of efficient and effective humidity control of the circulating medium.

Those skilled in the art will appreciate that various changes and modifications can be made in the apparatus described herein without departing from the spirit and scope of the invention.

I claim:

1. In a food processing oven having a walled housing including a closed food processing chamber therein for holding food to be processed, baffle means within said chamber for establishing a circulatory path for air movement within said chamber, air mover means having an inlet and an outlet for moving air contained within said chamber along said circulatory path, the improvement of means for heating the air within said oven and thus the oven and food to be processed contained therein comprising a burner tube conduit extending longitudinally within said chamber and in said circulatory path, said tube having one end open to atmosphere and the other end terminating in a discharge opening within the chamber.

a gas burner mounted on said oven and outside said burner tube conduit for directing a flame into the said one end of said burner tube open to atmosphere.

2. The apparatus according to claim 1 in which said discharge opening in said other end of said burner tube is directed generally downstream of said circulatory path adjacent the outlet of said air remover means.

3. The apparatus according to claim 2 together with auxiliary discharge openings in the wall of said burner tube between said one end and said end terminating in a discharge opening.

4. The apparatus of claim 1 in which said air mover means is centrally located in one end of the food processing chamber and said burner tube enters the chamber generally beside and extends longitudinally along and substantially around said air mover means.

5. The apparatus of claim 4 in which said discharge opening is adjacent the outlet of said air remover means.

6. The apparatus of claim 4 in which the total length of said burner tube exceeds any major dimension of the food processing chamber.

7. The apparatus according to claim 6 in which said discharge opening in said other end of said burner tube is directed generally downstream of said circulating path.

8. The apparatus of claim 1 in which said air mover means comprises a blower wheel mounted for rotation centrally of one end of said food processing chamber and in which said burner tubes enters said housing near one corner and extends longitudinally along and around the inner periphery of said food processing chamber adjacent said blower wheel.

9. The apparatus of claim 1 in which said processing chamber is provided with an outlet stack upstream in said circulatory path of said discharge opening of said burner tube for permitting the heated air circulated through said food processing chamber to escape to atmosphere, together with an auxiliary blower mounted outside said food processing chamber having an outlet connected by conduit to said outlet stack to dilute the heated air exhausted from said food processing chamber with cooler air whereby to control the temperature of the air leaving the outlet stack.

10. The apparatus of claim 9 in which said air mover means includes a blower wheel mounted for rotation within said food processing chamber by an electric motor mounted outside said food processing chamber, said auxiliary blower having a driving connection with said electric motor.

11. The apparatus of claim 10 in which said electric motor is cooled by air passing through it and in which said auxiliary blower has an intake in communication with said motor for drawing cooling air through said motor.

12. The apparatus according to claim 8 together with means for controlling the humidity within said food processing chamber comprising a supply of water outside said food processing chamber, a water conduit connected to said water supply and entering said food processing chamber and terminating in a discharge opening above the outlet of said blower wheel for dropping controlled amounts of water into the output of said wheel whereby said water is atomized and vaporized and distributed in the air circulating in the food processing chamber.

References Cited

UNITED STATES PATENTS

| | | | |
|---|---|---|---|
| 2,041,930 | 5/1936 | Houlis | 126—91AUX |
| 3,324,844 | 6/1967 | Huffman | 126—21A |
| 3,384,068 | 5/1968 | Perry et al. | 126—21A |

FOREIGN PATENTS

| | | | |
|---|---|---|---|
| 742,248 | 12/1955 | Great Britain | 126—21A |
| 812,417 | 4/1959 | Great Britain | 126—21A |

OTHER REFERENCES

Carrier: German App. No. 1,142,804, pub. Jan. 31, 1963.

CHARLES J. MYHRE, Primary Examiner

U.S. Cl. X.R.

126—91A

UNITED STATES PATENT OFFICE
CERTIFICATE OF CORRECTION

Patent No. 3,605,717                Dated September 20, 1971

Inventor(s) Paul H. Sauer

It is certified that error appears in the above-identified patent and that said Letters Patent are hereby corrected as shown below:

Column 1, the paragraph beginning "In the path," should read --In the past,--.

Column 2, line 46, after "volumes" insert --of--;

line 69, change "botton" to --bottom--.

Column 6, line 46, change "remover" to --mover--;

line 57, change "remover" to --mover--.

Signed and sealed this 14th day of March 1972.

(SEAL)
Attest:

EDWARD M.FLETCHER,JR.             ROBERT GOTTSCHALK
Attesting Officer                  Commissioner of Patents